US012766442B2

(12) United States Patent
Bunting et al.

(10) Patent No.: US 12,766,442 B2
(45) Date of Patent: Oct. 20, 2026

(54) SYSTEMS AND METHODS FOR MIXTURE SEPARATION

(71) Applicant: Jackie's BST, LLC, Bozeman, MT (US)

(72) Inventors: Rad Taylor Bunting, Bozeman, MT (US); Jackie O. Bunting, Bozeman, MT (US)

(73) Assignee: Jackie's BST, LLC, Bozeman, MT (US)

( * ) Notice: Subject to any disclaimer, the term of this patent is extended or adjusted under 35 U.S.C. 154(b) by 342 days.

(21) Appl. No.: 17/730,167

(22) Filed: Apr. 26, 2022

(65) Prior Publication Data

US 2022/0339559 A1 Oct. 27, 2022

Related U.S. Application Data

(60) Provisional application No. 63/180,067, filed on Apr. 26, 2021.

(51) Int. Cl.
*B01D 21/26* (2006.01)
*B01D 21/24* (2006.01)

(52) U.S. Cl.
CPC ........ *B01D 21/265* (2013.01); *B01D 21/2411* (2013.01)

(58) Field of Classification Search
CPC .... B01D 21/265; B01D 2221/04; B04C 3/00; B04C 2003/006
See application file for complete search history.

(56) References Cited

U.S. PATENT DOCUMENTS 2,757,581 A * 8/1956 Boadway ............... B01D 21/26 209/730
2,835,387 A 5/1958 Fontein
(Continued)

FOREIGN PATENT DOCUMENTS

CN 103111162 A 5/2013
CN 107126770 A 9/2017
(Continued)

OTHER PUBLICATIONS

"Liquid-solids separator/concentrator,1" inlet/outlet, 19 to 32 GPM, retrieved at https://www.coleparmer.com/i/liquid-solids-separator-concentrator-1-inlet-outlet-19-to-32-gpm/2999506 on Apr. 6, 2021.
(Continued)

*Primary Examiner* — In Suk C Bullock
*Assistant Examiner* — Adam Adrien Germain
(74) *Attorney, Agent, or Firm* — Holland & Hart LLP

(57) ABSTRACT

A separator includes an inlet manifold, a throat, and an outlet manifold. The inlet manifold is configured to receive a flow of the mixture. The throat is attached to the inlet manifold. The throat separates heavy species of the mixture from light species of the mixture. The outlet manifold is attached to the throat. The outlet manifold includes an outlet valve and a throttle shaft. The outlet valve includes a cone-shaped inlet and a bowl-shaped outlet. The throttle shaft includes a shaft and a cone-shaped head. The cone-shaped head is positioned within the cone-shaped inlet and the shaft extends through the bowl-shaped outlet. The bowl-shaped outlet, the cone-shaped inlet, and the cone-shaped head are sized and shaped to control the flow of the heavy species through the outlet valve and the flow of the mixture through the separator.

22 Claims, 17 Drawing Sheets

(56) References Cited

U.S. PATENT DOCUMENTS

| | | | | | |
|---|---|---|---|---|---|
| 3,199,269 | A * | 8/1965 | Karl-Heinz | B04C 5/12 96/372 |
| 4,859,347 | A | 8/1989 | Simon | |
| 4,872,890 | A | 10/1989 | Lamprecht et al. | |
| 5,039,317 | A | 8/1991 | Thompson et al. | |
| 5,062,955 | A * | 11/1991 | Sciamanna | B04C 5/103 210/512.1 |
| 5,207,805 | A | 5/1993 | Kalen et al. | |
| 5,391,220 | A | 2/1995 | Patterson | |
| 5,676,733 | A * | 10/1997 | Kohr | C22B 11/00 75/712 |
| 5,900,137 | A * | 5/1999 | Homan | E21B 21/06 175/48 |
| 6,811,690 | B2 | 11/2004 | Arnaud | |
| 6,935,513 | B2 | 8/2005 | Simon et al. | |
| 6,958,107 | B1 * | 10/2005 | Clarke | B04C 5/06 202/175 |
| 7,288,202 | B2 | 10/2007 | Maier | |
| 8,313,565 | B2 | 11/2012 | Sarshar et al. | |
| 8,333,825 | B2 | 12/2012 | Sarshar et al. | |
| 8,747,679 | B2 | 6/2014 | Sarshar et al. | |
| 9,248,385 | B2 * | 2/2016 | Fraim | B04B 5/12 |
| 10,610,823 | B2 | 4/2020 | Ashton et al. | |
| 2004/0118752 | A1 * | 6/2004 | Simon | B01D 53/00 209/143 |
| 2005/0016918 | A1 * | 1/2005 | Walker | B01D 21/2411 210/519 |
| 2012/0180668 | A1 | 7/2012 | Borissov et al. | |
| 2018/0363979 | A1 | 12/2018 | Shaikh et al. | |
| 2020/0346139 | A1 * | 11/2020 | Marshall | B01D 21/02 |

FOREIGN PATENT DOCUMENTS

| | | | | |
|---|---|---|---|---|
| GB | 2177951 | A * | 2/1987 | B04C 5/14 |
| WO | 90/05591 | A1 | 5/1990 | |
| WO | 01/56441 | A1 | 8/2001 | |
| WO | 2004/056441 | A2 | 7/2004 | |
| WO | 2009/037496 | A2 | 3/2009 | |
| WO | 2015/122919 | A1 | 8/2015 | |

OTHER PUBLICATIONS

Altam, R. A., et al., "Trends in Supersonic Separator design development", MATEC Web of Conferences, vol. 131, 2017, 11 Pages.

International Search Report and Written Opinion of the International Searching Authority, issued in connection with Int'l Appl. No. PCT/US2022/026420, dated Jul. 15, 2022 (9 pages).

"International Search Report and Written Opinion of the International Searching Authority," issued in connection with Int'l Appl. No. PCT/US23/66265, dated Sep. 5, 2023.

European Patent Office, "Extended Search Report," issued in connection with European Patent Application No. 22796592.8 dated May 15, 2025 (9 pages).

European Office Action issued in European Patent Application No. 22796592.8 dated Mar. 2, 2026 (1-5 pages).

Saudi Arabia Office Action issued in Saudi Arabia Patent Application No. 1120246042 dated Mar. 11, 2026 (1-5 pages).

Supplementary Extended European search report issued in connection with Int'l Appl. No. PCT/U.S. Pat. No. 2023066265, dated Mar. 6, 2026 (8 pages).

* cited by examiner

SYSTEMS AND METHODS FOR MIXTURE SEPARATION

CROSS REFERENCE TO RELATED APPLICATIONS

This application is a Non-Provisional application of U.S. Provisional Application No. 63/180,067, filed Apr. 26, 2021, and entitled "SYSTEMS AND METHODS FOR MIXTURE SEPARATION", the entire disclosure of which is incorporated herein by this reference.

FIELD OF TECHNOLOGY

The present invention generally pertains to the field of separating components of a mixture, and more particularly to a device that provides for mixture separation by the formation of a generally spiraling flow.

BACKGROUND

There are numerous situations where it is desirable to separate component parts of a mixture. For example, natural gas wells typically contain the sought after natural gas ($CH_4$) along with contaminants such as carbon dioxide ($CO_2$), Nitrogen ($N_2$), and hydrogen sulfide ($H_2S$). By some estimates, the United States has trillions of cubic feet of natural gas that requires processing to separate out the contaminants from the natural gas. In another example, water sources, such as retention ponds, abandoned mines, reservoirs, lakes, seas, and the like, may contain various substances such as salt, arsenic, iron, copper, lead, zinc, cadmium, other metals, and fertilizer and insecticide run off. Such substances can render the water source unusable and can seep into the water table and have devastating effects on water quality over broad geographic areas.

Numerous conventional devices exist that can separate components of a mixture. Many conventional devices, however, are burdened with various deficiencies, such as high cost, installation complication, maintenance costs and frequency, and remote location deployment.

SUMMARY

The described technology includes methods, systems, devices, and apparatuses for a separator for separating components of a mixture. In some embodiments, the separator includes an inlet manifold, a throat, and an outlet manifold. The inlet manifold is configured to receive a flow of the mixture. The inlet manifold forms the mixture into a spiraling flow. The throat is attached to the inlet manifold and is configured to receive a flow of the mixture from the inlet manifold. The throat separates heavy species of the mixture from light species of the mixture. The outlet manifold is attached to the throat and is configured to receive a flow of the heavy species from the throat. The outlet manifold includes an outlet valve and a throttle shaft. The outlet valve includes a cone-shaped inlet and a bowl-shaped outlet. The throttle shaft includes a shaft and a cone-shaped head. The cone-shaped head is positioned within the cone-shaped inlet and the shaft extends through the bowl-shaped outlet. The bowl-shaped outlet, the cone-shaped inlet, and the cone-shaped head are sized and shaped to control the flow of the heavy species through the outlet valve and the flow of the mixture through the separator.

In some embodiments, a method of separating components of a mixture using a separator is provided. The method includes channeling the mixture into an inlet manifold of the separator. The method also includes forming the mixture into a spiraling flow within the inlet manifold. The method further includes channeling the mixture from the inlet manifold to a throat of the separator. The method also includes separating heavy species of the mixture from light species of the mixture within the throat. The method further includes channeling a flow of the heavy species from the throat to an outlet manifold of the separator. The outlet manifold includes an outlet valve including a cone-shaped inlet and a bowl-shaped outlet and a throttle shaft includes a shaft and a cone-shaped head. The cone-shaped head is positioned within the cone-shaped inlet and the shaft extends through the bowl-shaped outlet. The method also includes controlling the flow of the heavy species through the outlet valve and the flow of the mixture through the separator using the bowl-shaped outlet, the cone-shaped inlet, and the cone-shaped head. The bowl-shaped outlet, the cone-shaped inlet, and the cone-shaped head are sized and shaped to control the flow of the heavy species through the outlet valve and the flow of the mixture through the separator.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following more particular written Detailed Description of various implementations as further illustrated in the accompanying drawings and defined in the appended claims.

These and various other features and advantages will be apparent from a reading of the following Detailed Description.

DETAILED DESCRIPTION

The disclosed technology is directed to a separator that is useful for partially or completely separating components of a mixture. Specifically, the disclosed separator combines high velocity swirling flows that result in a tornado-like centrifugal force field and retrograde flow fields within swirling flows in methods that allow heavy species, as a group, to be separated from the lightest species.

In one application, precious metals may be extracted from black sand tailings from mines with the disclosed separator. Precious metal extraction technologies are limited in their ability to separate and collect precious metal deposits at certain low-micron levels. A considerable amount of precious metals are left unextracted from 50 microns down to sub-micron levels where incumbent mining extraction technologies lack the ability to separate light particulates (sand) from the heavy particulates (precious metals). This structural deficiency does not allow current and prior operations to yield the highest amount of precious metals possible, and yet also mitigate operational-extraction costs inherent to existing processes.

The disclosed separator is specifically geared towards separation and collection of precious metals between 50 microns and the sub-micron level, thereby producing a higher yield per ton of precious metals material. The device utilizes high-pressure air and water injection through high velocity swirling flows to cause micro-particle separation. It leverages tornado-like centrifugal force to allow extractors to separate heavy particulates from light particulates, in a highly-portable, compact piece of equipment that: (1) has no moving parts for easy repair and maintenance; (2) only uses water, air and electricity utilities; and (3) is easily scalable to industrial-grade platforms.

In one example, a disclosed device displays over 90% separation of particles down to approximately 10 microns and continuous stabilized separation of higher micron particles.

Figure 1:
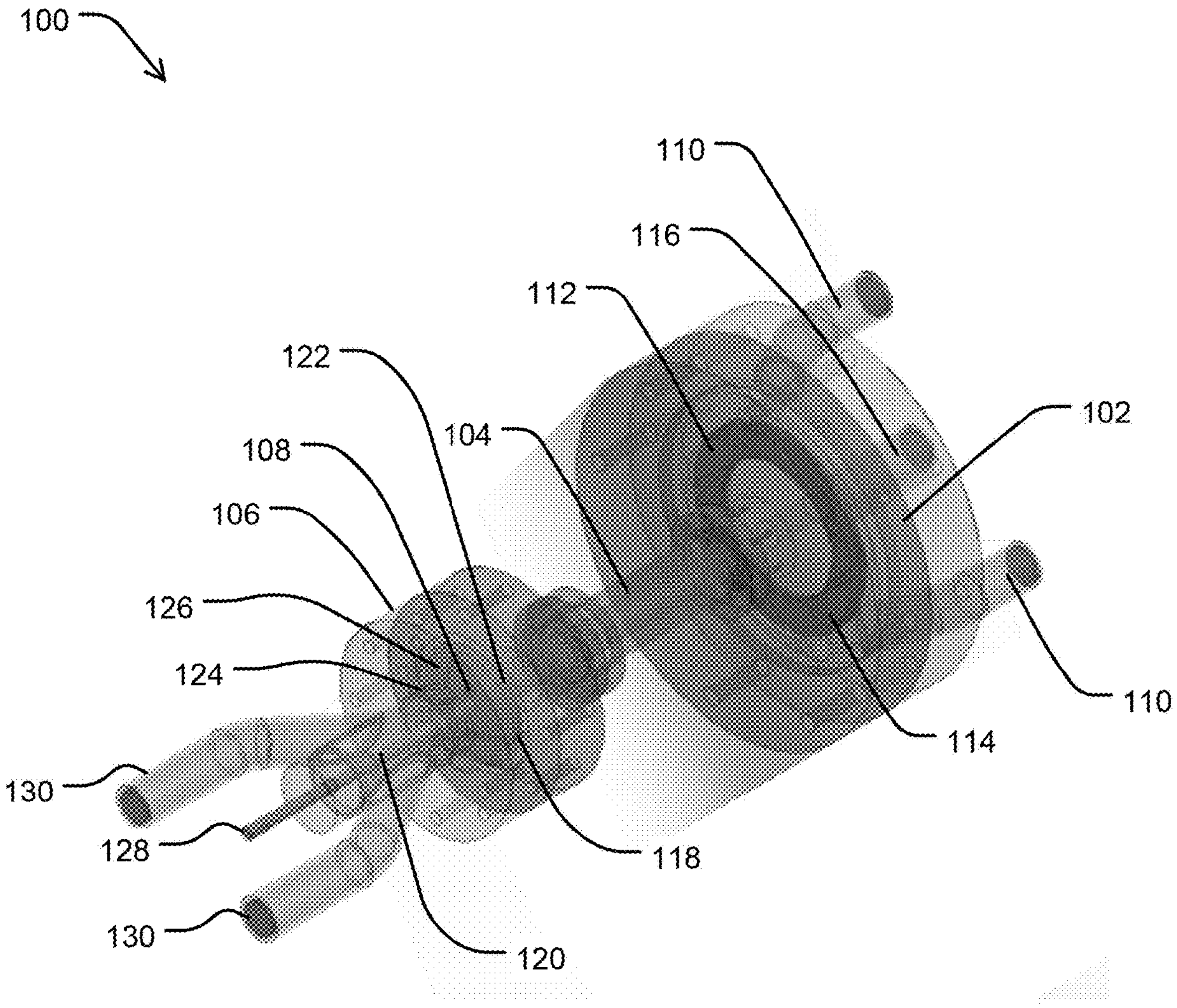
FIG. 1 is a perspective view of an embodiment of a separator in accordance with the present invention.

FIG. 1 is a perspective view of an embodiment of a separator 100. The separator 100 separates a mixture of liquids, solids, or any combination thereof (not shown). In an application for processing black sand tailings from mines, the separator 100 is connected with the outlet of a mine or a Black Sand tailings collection device. The tailings are transmitted into the separator 100, where it forms a tornado-like or spiraling flow due to the characteristics of the separator 100. The tornado-like flow causes one or more of the components of the mixture to separate partially or completely. From the separator, precious metals, are expelled from an exhaust pipe of the separator 100, and the remaining tailings are channeled to a water treatment facility, to a storage tank, to some other destination, or to one or more additional separators for further processing. Advantageously, the separator 100 is primarily made of non-moving parts and thus is readily and efficiently employed in nearly any mine and requires little maintenance or adjustment.

Figure 2:
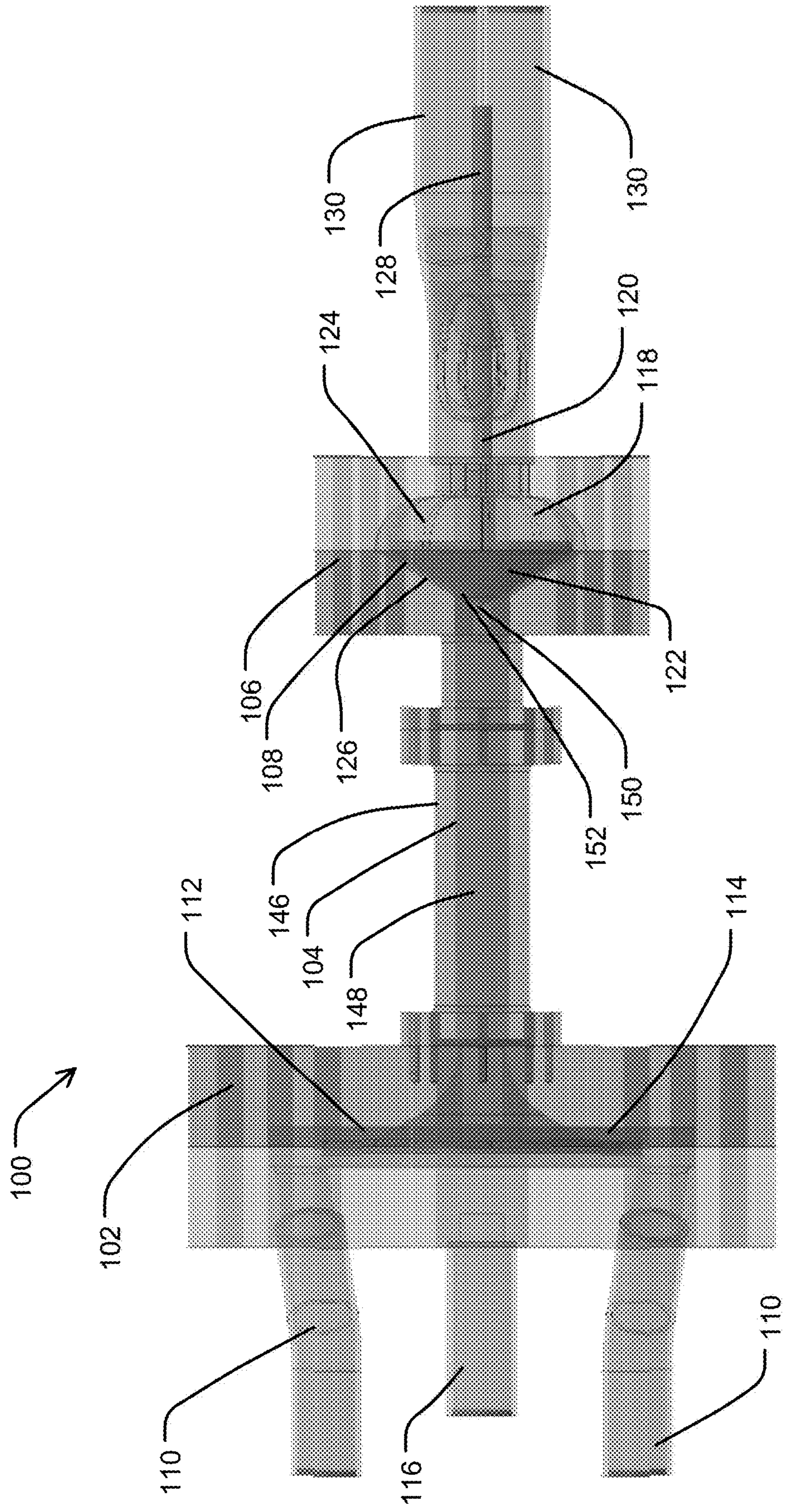
FIG. 2 is a side view of the separator illustrated in FIG. 1 in accordance with the present invention.
Figure 3:
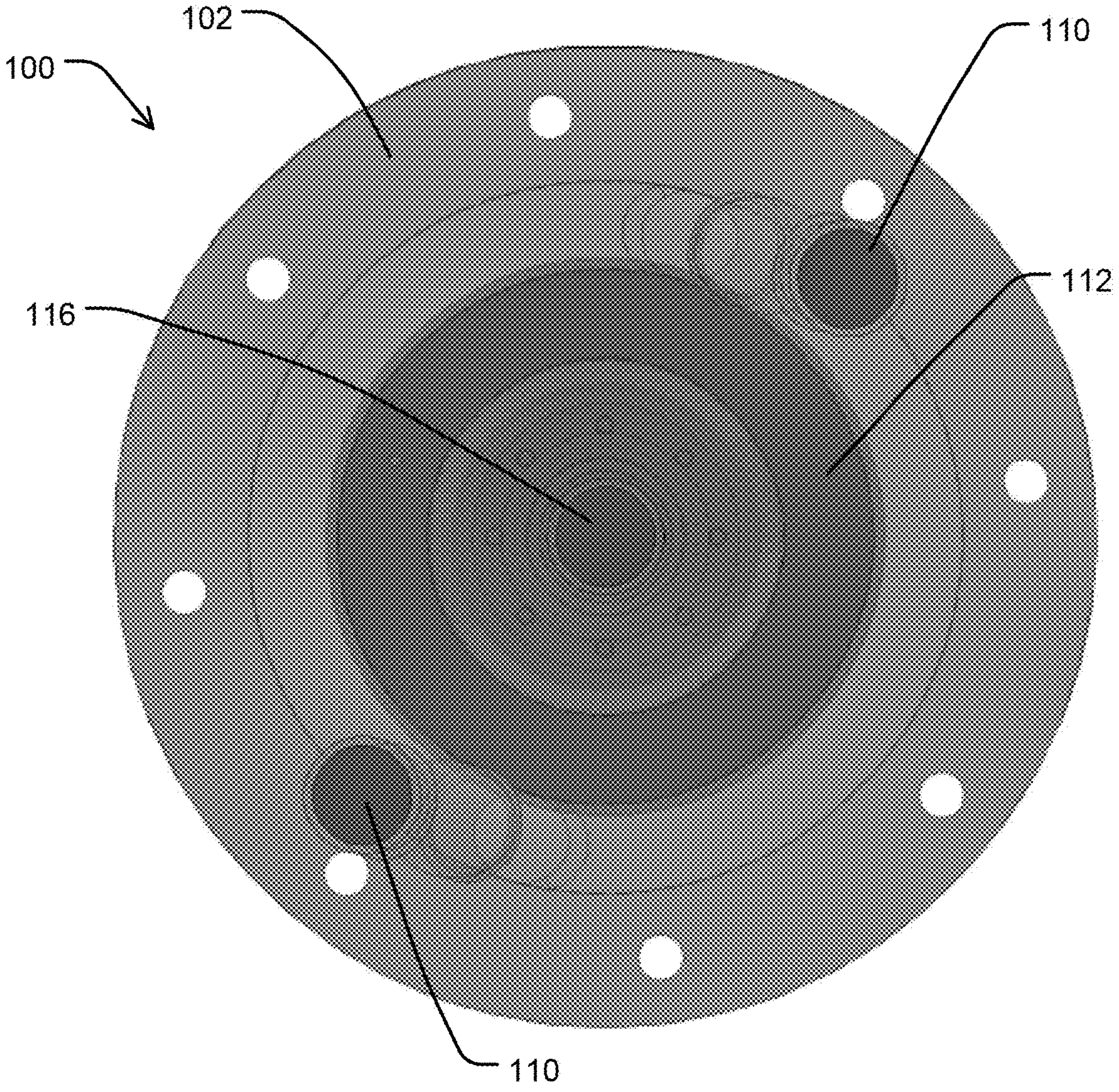
FIG. 3 is an end view of the separator illustrated in FIG. 1 in accordance with the present invention.
Figure 4:
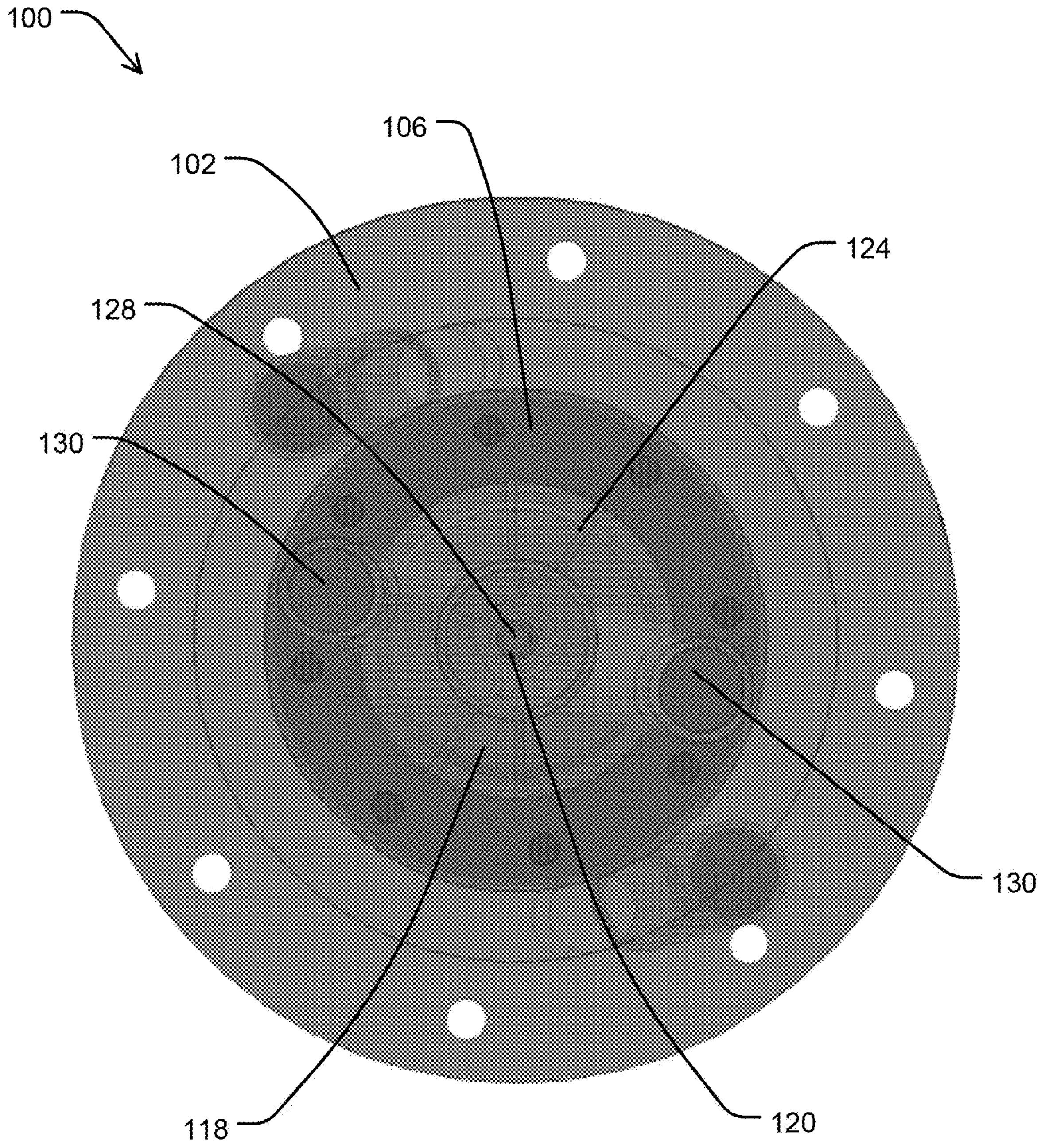
FIG. 4 is an end view of the separator illustrated in FIG. 1 in accordance with the present invention.
Figure 5:
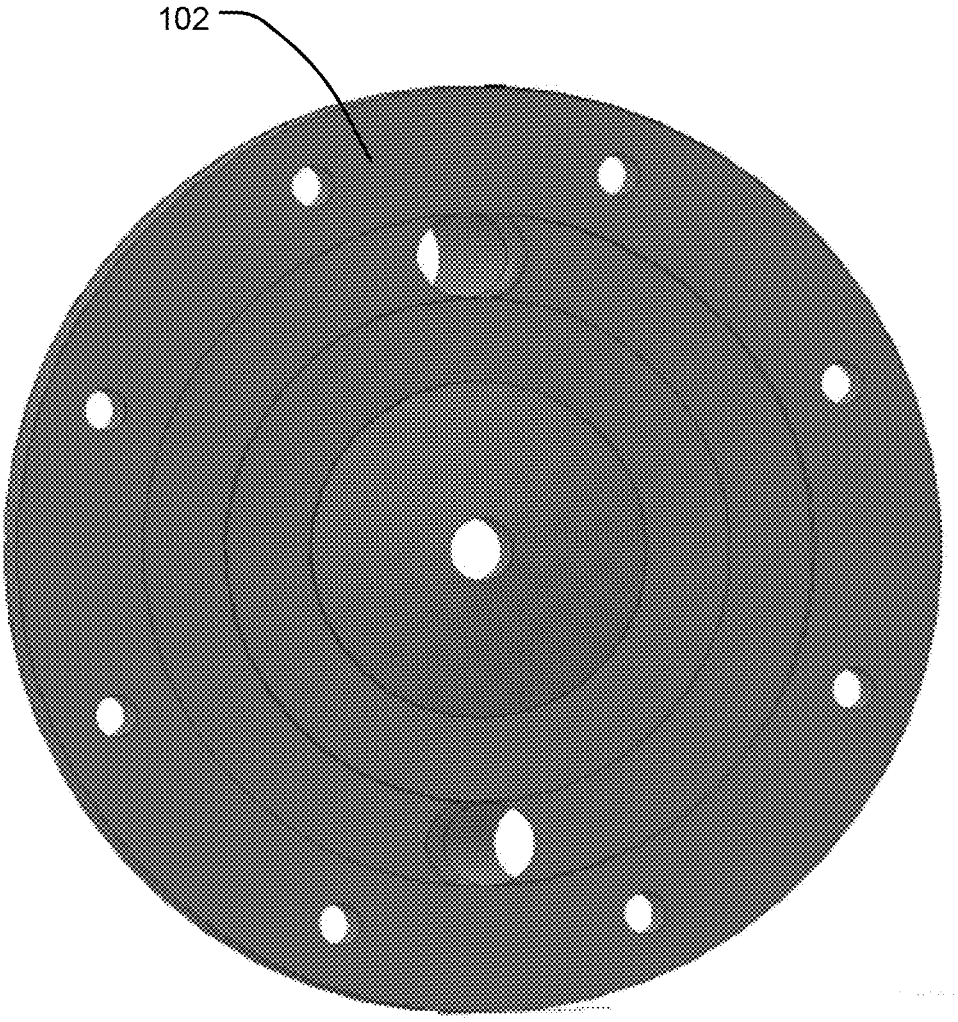
FIG. 5 is a perspective view of a portion of the inlet manifold of the separator illustrated in FIG. 1 in accordance with the present invention.
Figure 6:
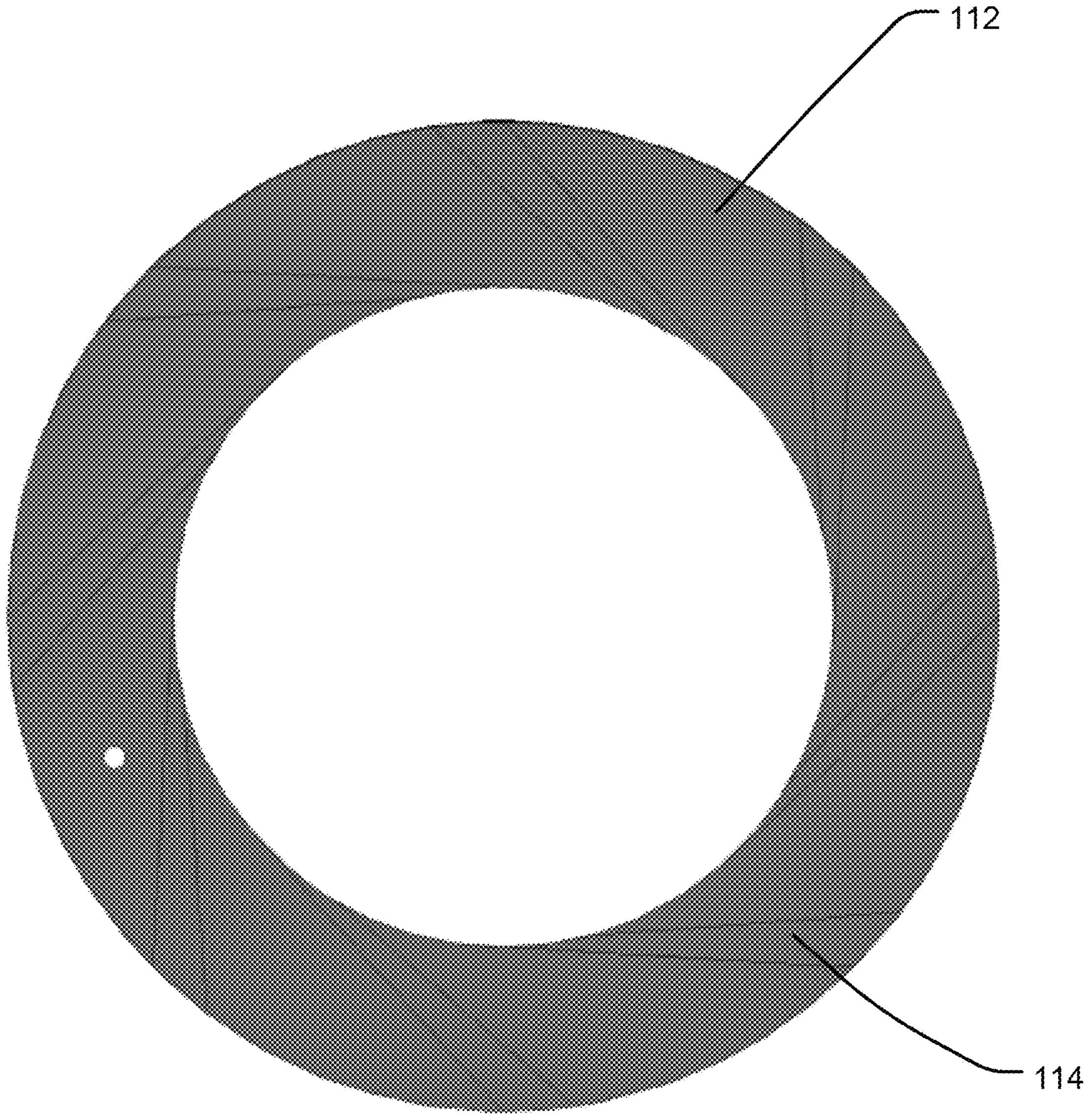
FIG. 6 is an end view of an inlet plate of the separator illustrated in FIG. 1 in accordance with the present invention.
Figure 7:
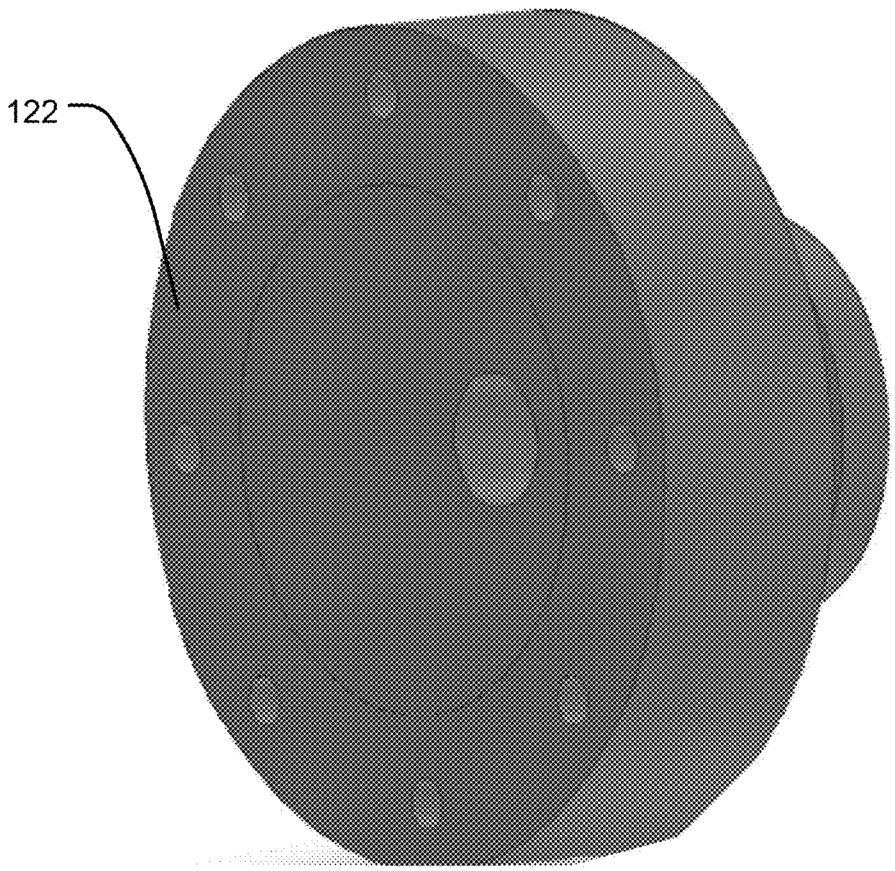
FIG. 7 is a perspective view of a cone-shaped inlet of the separator illustrated in FIG. 1 in accordance with the present invention.
Figure 8:
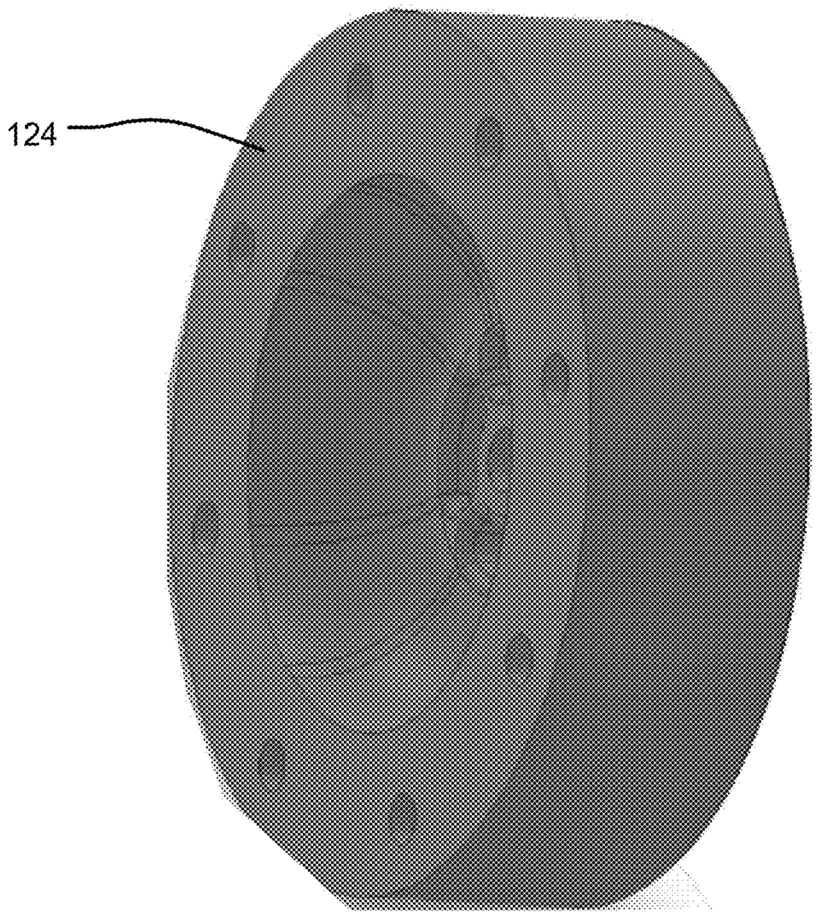
FIG. 8 is a perspective view of a bowl-shaped outlet of the separator illustrated in FIG. 1 in accordance with the present invention.
Figure 9:
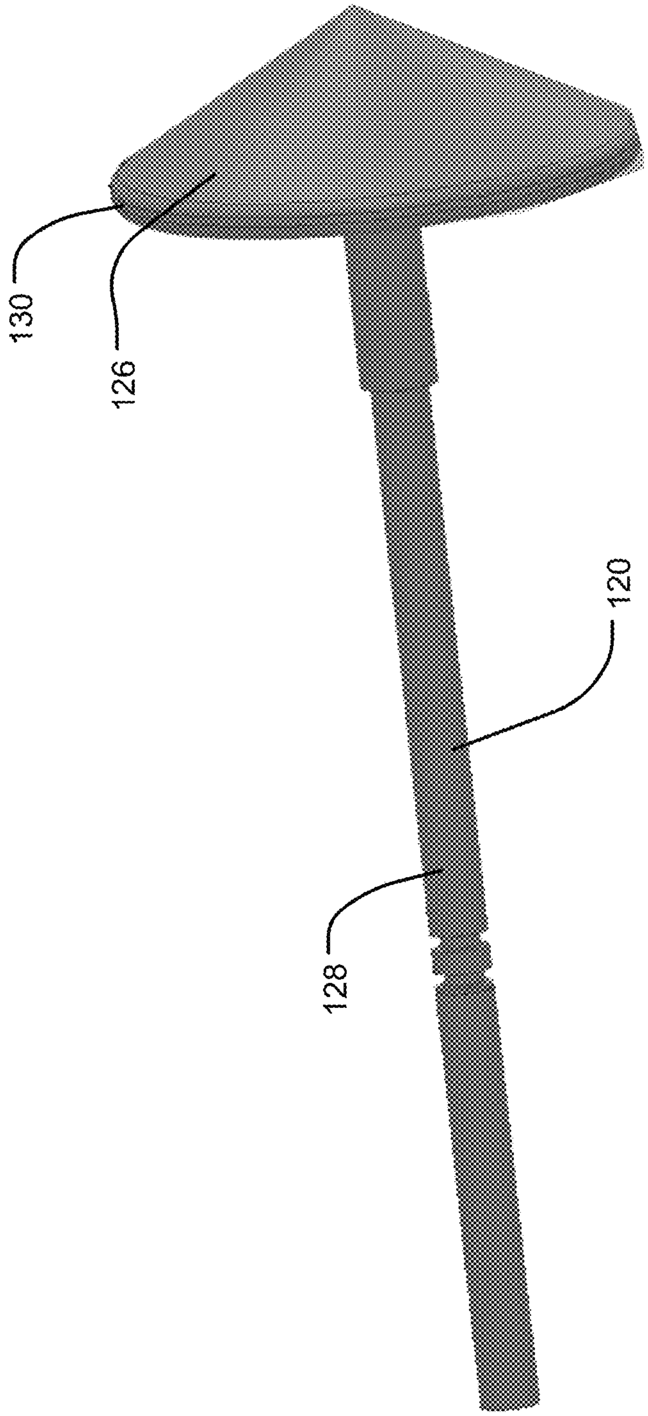
FIG. 9 is a perspective view of a throttle shaft of the separator illustrated in FIG. 1 in accordance with the present invention.
Figure 10:
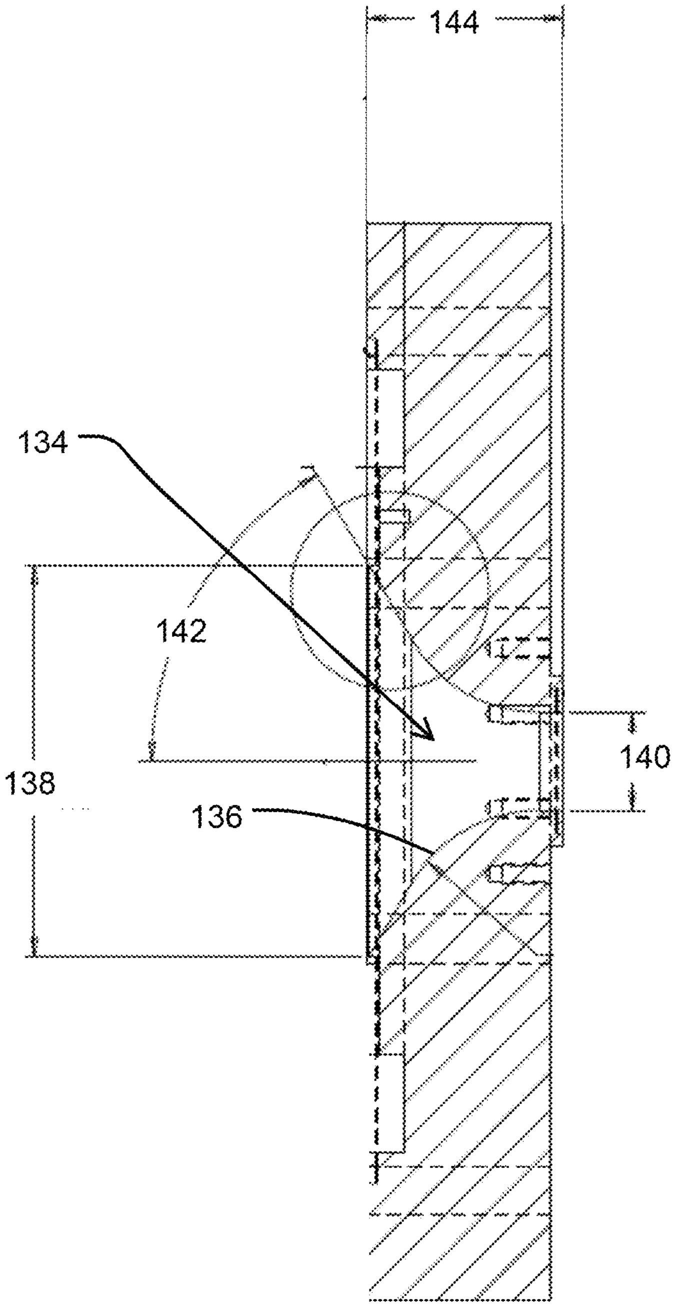
FIG. 10 is a schematic side cutaway view of a portion of an inlet manifold of the separator illustrated in FIG. 1 in accordance with the present invention.
Figure 11:
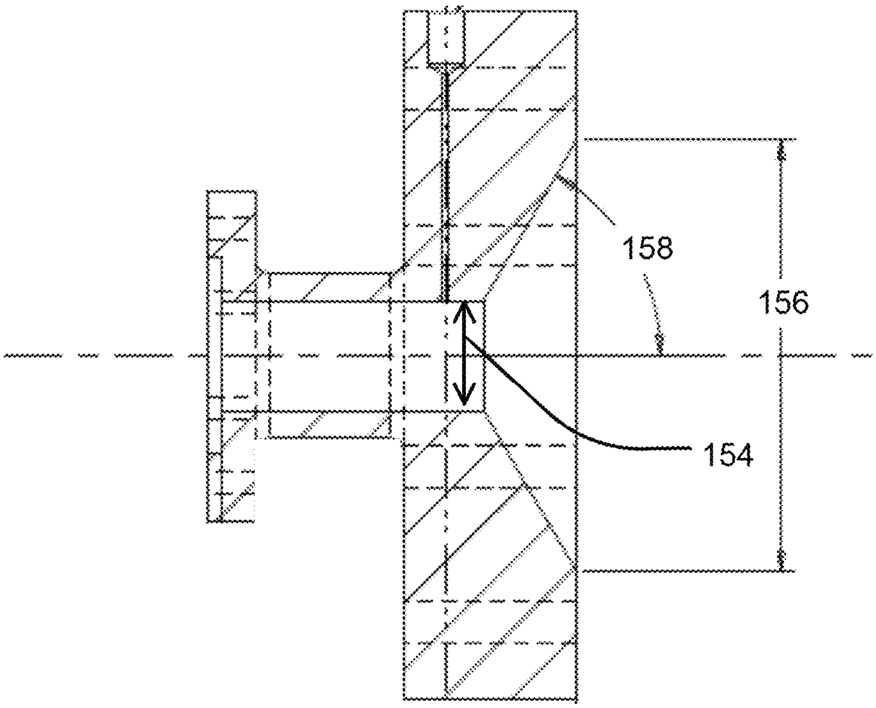
FIG. 11 is a schematic side cutaway view of a portion of an outlet manifold of the separator illustrated in FIG. 1 in accordance with the present invention.
Figure 12:
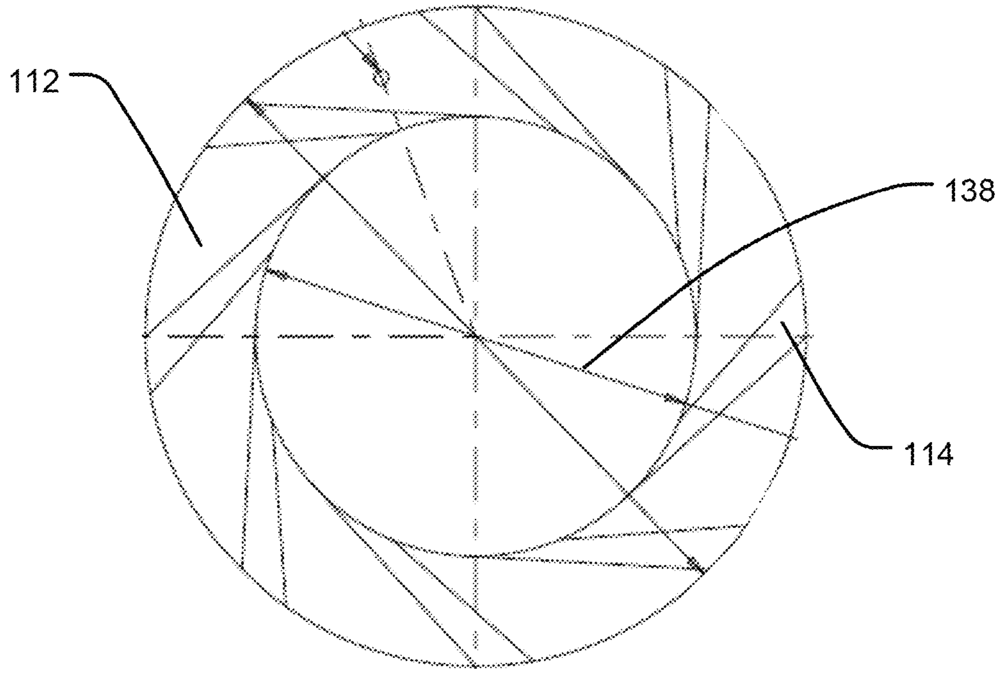
FIG. 12 is a schematic front view of a portion of an outlet manifold of the separator illustrated in FIG. 1 in accordance with the present invention.
Figure 13:
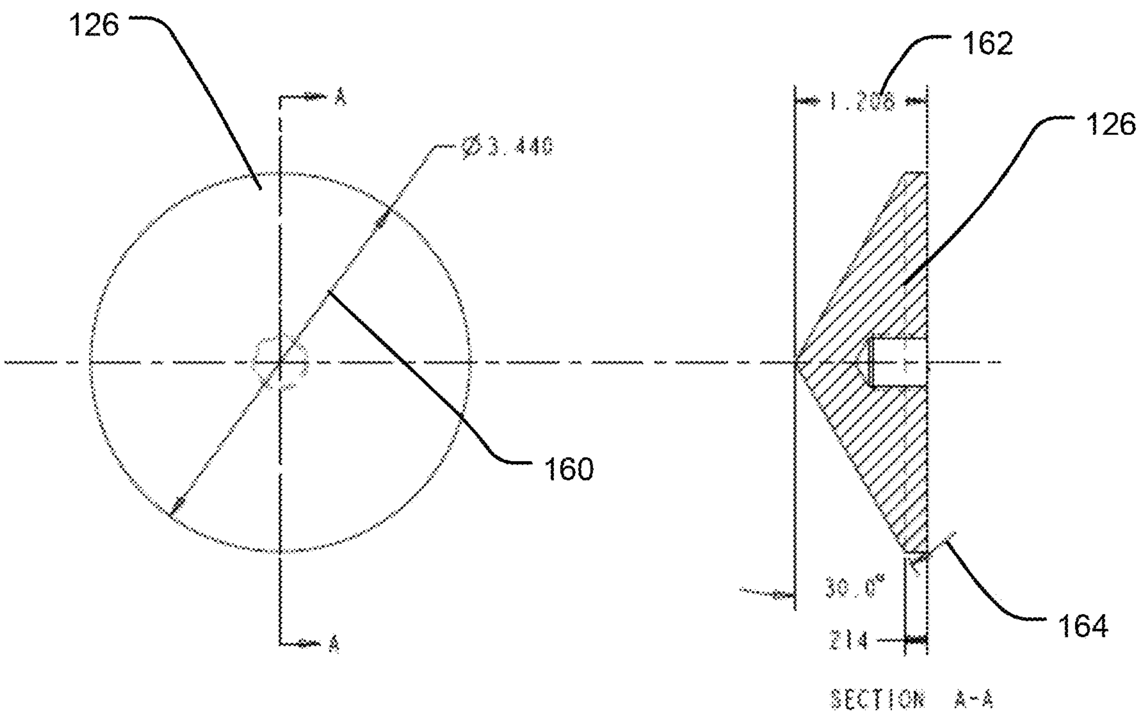
FIG. 13 is a schematic front view and a schematic side cutaway view of a portion of a throttle of the separator illustrated in FIG. 1 in accordance with the present invention.

FIG. 2 is a side view of the separator 100. FIG. 3 is an end view of the separator 100. FIG. 4 is an end view of the separator 100. FIG. 5 is a perspective view of a portion of the inlet manifold 102. FIG. 6 is an end view of the inlet plate 112. FIG. 7 is a perspective view of the cone-shaped inlet 122. FIG. 8 is a perspective view of the bowl-shaped outlet 124. FIG. 9 is a perspective view of the throttle shaft 120. FIG. 10 is a schematic side cutaway view of a portion of an inlet manifold 102. FIG. 11 is a schematic side cutaway view of a portion of an outlet manifold 106. FIG. 12 is a schematic front view of a portion of an outlet manifold 106. FIG. 13 is a schematic front view and a schematic side cutaway view of a portion of the throttle shaft 120.

The separator 100 generates a converging spiraling inflow of a mixture to separate components, a divergent exhaust flow of some components, and a retrograde exhaust flow of other components. Generally, the combination of the convergent spiraling inflow of mixture and the spiraling retrograde exit flow of one or more separated components of the mixture may together be considered as a tornado-like flow. The separator 100 includes an inlet manifold 102 that increases the angular velocity of the mixture, at least partially separating the mixture. The separator 100 also includes a throat 104 that receives the mixture from the inlet manifold 102 and further separates the mixture. The mixture is separated into a flow of heavier species and a flow of lighter species. The separator 100 may be constructed of any material suitable to withstand the forces within the separator and the corrosive or other damaging effect of the mixture being separated. Such materials include stainless steel, alloys, polymers, or other composite resin type materials.

The flow of heavier species flows into an outlet manifold 106, and the flow of lighter species is separated from the flow of heavier species in the throat 104 and flows back through the throat 104 as a retrograde flow. The outlet manifold 106 also includes an outlet valve or throttle 108 for controlling the flow from the outlet manifold 106. The separator may be used to desalinate water, separate heavy metal species (such as gold) from liquid and solid materials, and separate nuclear material from liquid and solid materials.

In the illustrated embodiment, the mixture is channeled into the inlet manifold 102 of the separator 100, and the inlet manifold 102 is sized and shaped to form the mixture into a high velocity swirling flow or spiraling flow. Specifically, the inlet manifold 102 includes two inlet pipes 110 that are shaped in a spiral shape that form the mixture into the high velocity swirling flow or spiraling flow. The inlet manifold 102 also includes an inlet plate 112 that includes inlet channels 114 shaped in a spiral shape that also form the mixture into the high velocity swirling flow or spiraling flow. In operation, a mixture of liquids, solids, or any combination thereof is introduced at high velocity into the inlet manifold 102. The mixture spirals through the inlet manifold 102. As the mixture spins through the inlet manifold 102, its angular velocity increases partially as a function of the convergent angle of the inlet manifold 102. Upon reaching an outlet of the inlet manifold 102, some or all of the separation of the mixture will have occurred. Generally, the angular velocity of the mixture through the convergent inlet manifold 102 causes the mixture to separate such that the higher mass components of the mixture are located toward the outer most portion of the flow and the lower mass components of the mixture are located toward the inner portion of the flow. In some instances, the spiraling flow will include roughly defined stratified layers of decreasing mass components located radially inward from a highest mass outer layer. In a configuration adapted to separate a mixture in accordance with molecular mass, during separation the highest mass molecular species will migrate toward the outer portions of the flow causing a separation such that lower molecular mass species will be constrained inwardly of the higher molecular mass species.

The mixture is fed into the two inlet pipes 110 where a high velocity circular flow is begun and communicated into the inlet manifold 102 to form an accelerating convergent spiraling flow. In any implementation of a separator 100, the mixture should be fed into the two inlet pipes 110 at a velocity such that the velocity of the spiraling flow through the separator 100 does not meet or exceed the speed of sound. In one example, the mixture is fed into the two inlet pipes 110 such that the mixture has an angular velocity within the inlet manifold 102 adjacent the throat 104 of about 0.5 mach. In some embodiments, the two inlet pipes 110 may be disposed at an angle or tangentially with portions of the inlet manifold 102 to help facilitate a high velocity circular flow within the inlet manifold 102.

The inlet manifold 102 may be directly connected with the outlet manifold 106. In one particular embodiment of the invention, the throat 104 defines a substantially cylindrical chamber which is interposed between the inlet manifold 102 and the outlet manifold 106. Thus, the mixture spins out of the inlet manifold 102 and into the throat 104. Within the throat 104, further separation of the mixture occurs as the mixture spins through the throat 104 toward the outlet manifold 106. Also, within the throat 104, a spiraling retrograde flow is formed primarily of lighter components. The retrograde flow is generally within a larger diameter exhaust flow of heavier components. Along the retrograde flow, further separation occurs such that some heavier components separate, change direction, and merge into the outlet manifold 106.

The inlet manifold 102 channels the mixture into the throat 104 where the high velocity swirling flow or spiraling flow is fully developed. The high velocity swirling flow causes one or more of the components of the mixture to partially or completely separate from other components with the mixture. The high velocity swirling flows within the throat 104 result in a high velocity swirling flow centrifugal force field and retrograde flow fields within swirling flows such that at least some heavy species are separated from the light species. The heavy species are channeled to the outlet manifold 106 and the light species are channel to an outlet pipe 116 of the inlet manifold 102. Specifically, the high velocity swirling flows generate a retrograde flow field that is directed in a direction opposite the direction of flow of the tornado-like or spiraling flow. The retrograde flow field channels the light species out of the separator 100 through the outlet pipe 116.

Specifically, in the illustrated embodiment, the inlet manifold 102 further includes a conical chamber 134. The conical chamber 134 includes a continuous inner conical side wall 136 arranged to cooperate with the inlet channels 114 of the inlet plate 112. In one implementation, the inner conical side wall 136 of the conical chamber 134 abuts the inlet channels 114 of the inlet plate 112 in alignment with the inlet channels 114 of the inlet plate 112. The inner conical side wall 136 adjacent the inlet channels 114 has a diameter about the same as the inlet channels 114 to provide a smooth transition of the mixture as it flows over the seam between the inlet channels 114 and the inner conical side wall 136. Additionally, the inner conical side wall 136 of the conical chamber 134 abuts the throat 104 and is in alignment with the throat 104. The inner conical side wall 136 adjacent the throat 104 has a diameter about the same as the throat 104 to provide a smooth transition of the mixture as it flows over the seam between the throat 104 and the inner conical side wall 136. The smooth transition helps to avoid disturbances in the flow, which can disrupt the separation of the mixture.

As shown in FIGS. 10 and 12, the conical chamber 134 includes a first diameter 138 and a second diameter 140. The first diameter 138 is the outer diameter of the conical chamber 134 and the inner diameter of the inlet channels 114. The second diameter 140 is the inner diameter of the conical chamber 134 and the inner diameter of the throat 104. In the illustrated embodiment, the first diameter 138 is about 4 inches and the second diameter 140 is about 1 inch. Additionally, the inner conical side wall 136 defines a first angle 142 that continuously varies along a length 144 of the conical chamber 134. The maximum first angle 142 is about 60° at the first diameter 138 and the angle decreases to about 0° at the second diameter 140. The length 144 is about 2 inches.

The conical chamber 134 reduces disturbances to the diverging spiral flow of the mixture. In some embodiments, the flow of the mixture from the inlet channels 114 into the conical chamber 134 may be disturbed by the rapid volumetric difference between the inlet channels 114 and the conical chamber 134, which may result in pressure fluctuations. Such pressure disturbances can result in less efficient separation of components of the mixture within the inlet manifold 102. The orientation of the inlet channels 114 relative to the conical chamber 134 can reduce pressure fluctuations. Specifically, the inlet channels 114 have a spiral shape that forms a spiral flow into the conical chamber 134.

As the mixture spins through the conical chamber 134, heavier species are generally segregated toward the inner conical side wall 136 and lighter species are generally segregated toward the center. In the case of a mixture containing two species, the heavier species will migrate toward the inner conical side wall 136 and the lighter species will migrate toward the center. In the case of a mixture with more than two components or species, as the mixture flows around and through the conical chamber 134, stratified bands of at least some of the components are formed with the heaviest species or component in the outer band adjacent the inner conical side wall 136, the lighter components forming bands inwardly from the outer band, and the lightest component forming a band adjacent the center. The amount of separation between the species will depend, in part, on the input velocity of the mixture into the conical chamber 134, the differences in mass between the species or components, the difference in specific gravity between the components, the difference in atomic number between the components, the existence and strength of any chemical bond, and the angle of convergence of the conical chamber 134. Thus, varying degrees of separation will be achieved within the conical chamber 134.

The mixture separates into component parts or species along the length 144 of the conical chamber 134 as the mixture converges toward the throat 104. The throat 104 includes an outer side wall 146 defining a cylindrical channel 148. The outer wall 146 of the throat section 104 has a diameter about the same as the second diameter 140 of the conical chamber 134. Although illustrated herein with a constant radius along its length, the throat may be slightly convergent or divergent toward the outlet manifold 106.

From the outlet of the conical chamber 134, the mixture flows into the throat 104. Within the throat 104, the mixture transitions from a generally convergent spiraling flow to a fairly uniform spiraling flow moving toward the outlet manifold 106 and continues to separate into its component parts. The throat 104 may be any length, and in one range of particular implementations is from between one and twelve inches. The length and diameter of the throat 104 may vary in a particular implementation as a function of the number and size of the components of the mixture, the pressure or velocity at which the mixture is forced into the plenum, the angle and length of the conical input channel, the amount of separation required, and other factors.

In an alternative separator (not shown), exhaust ports may be defined in the outer side wall 146 of the throat 104 to remove heavy components. In addition, a variable length throat 104 may be employed. In one example, a variable length throat (not shown) has a first cylindrical sleeve connected with the inlet manifold 102 and a second cylindrical sleeve connected with the outlet manifold 106. The sleeves have slightly different diameters such that one sleeve may slide within the other sleeve. As such, the overall length of the throat may be adjusted by moving one sleeve relative to the other. For example, if each sleeve is three inches, then by fully inserting one sleeve within the other the overall length of the throat will be about three inches. By fully separating the sleeves but leaving some portion of one sleeve within the other, a throat length of about six inches may be achieved. Moreover, the throat may be adjusted to any length between three and six inches. In such an embodiment, care should be taken to minimize the boundary edge formed between the two-sleeve section of the throat to avoid causing excessive turbulence.

The outlet pipe 116, preferably a cylindrical tube, is disposed within the inlet manifold 102. In addition, the outlet pipe 116 preferably is disposed along the axis of the throat 104 and the outlet pipe 116 is in fluid communication with the throat 104. Upon interaction with the throttle 108, the lower molecular mass components, in part, form the generally retrograde flow to the overall spinning and flowing of the mixture between the inlet manifold 102 and through the throat 104 towards the throttle 108. In the case of the separator 100 being used to process tailings from mines, the heavier components such as gold are expelled through the outlet manifold 106, while the lighter tailings components flow through the outlet pipe 116. The diameter of the outlet pipe 116 may vary depending on a particular implementation. In one example, the diameter of the outlet pipe 116 is slightly less than the diameter of the throat 104.

The outlet manifold 106 channels the heavy species out of the separator 100 and controls the flow of the mixture into and out of the separator 100. Specifically, the outlet valve or throttle 108 of the outlet manifold 106 includes an outlet valve basin 118 and a throttle shaft 120 partially positioned within the outlet valve basin 118. The throat 104 channels the heavy species into the outlet valve basin 118, and the outlet valve basin 118 and the throttle shaft 120 are sized and shaped to control the flow of heavy species through the outlet valve or throttle 108. Specifically, the outlet valve basin 118 includes a cone-shaped inlet 122 and a bowl-shaped outlet 124. The throttle shaft 120 has a cone-shaped head 126 that compliments the shape of the cone-shaped inlet 122 and is positioned within the cone-shaped inlet 122. The cone-shaped head 126 has a rounded edge 132. The throttle shaft 120 also has a shaft 128 that extends out of the outlet valve or throttle 108 through the bowl-shaped outlet 124. The bowl-shaped outlet 124 channels the heavy species to two outlet pipes 130 that channel the heavy species out of the separator 100. With such an arrangement, within the throat the exhaust flow of the heavier mass components of the mixture into the diffuser chamber is promoted and the flow of the lower molecular mass components toward the diffuser chamber is interrupted by the exhaust cone.

As shown in FIG. 11, the cone-shaped inlet 122 includes a first diameter 154 and a second diameter 156. The first diameter 154 is the inner diameter of the cone-shaped inlet 122 and the inner diameter of the throat 104. The second diameter 156 is the outer diameter of the cone-shaped inlet 122. In the illustrated embodiment, the first diameter 154 is about 1 inch and the second diameter 156 is about 4 inches. Additionally, the inner conical side wall 136 defines a first angle 158 that is about 60°.

The outlet valve or throttle 108 controls the flow of heavy species through the outlet valve or throttle 108 by changing a position of the throttle shaft 120 within the outlet valve or throttle 108. Specially, the throttle shaft 120 is inserted into the cone-shaped inlet 122 such that the cone-shaped head 126 at least partially restricts the flow of heavy species into the cone-shaped inlet 122 to reduce the flow of heavy species into the outlet valve or throttle 108 and to reduce the flow of the mixture into the separator 100. Conversely, the throttle shaft 120 is extracted from the cone-shaped inlet 122 such that the cone-shaped head 126 increases the flow of heavy species into the cone-shaped inlet 122 and increases the flow of the mixture into the separator 100.

In the illustrated embodiment, the cone-shaped inlet 122 and the cone-shaped head 126 have about the same angle with respect to the longitudinal axis of the separator 100. The cone-shaped head 126 and the cone-shaped inlet 122 define a conical exhaust channel 150 therebetween. The diffuser cone further defines a blunt end 152 at its apex. The blunt end 152 is arranged coaxially with the axis of the throat 104, and hence the overall longitudinal axis of the separator 100. Although a blunt shape is preferable, other shapes of the end 152 of the cone-shaped head 126 are possible.

The blunt end 152 is generally positioned near the outlet of the throat 104. In one implementation, the outlet valve or throttle 108 is configured to move along its longitudinal axis. As such, the blunt end 152 may be positioned with respect to the outlet of the throat 104. The width of the conical exhaust channel 150, i.e., the distance between the cone-shaped head 126 and the cone-shaped inlet 122, may be increased or decreased by positioning the outlet valve or throttle 108 away from or toward the throat 104, respectively. Such adjustment will also increase or decrease the annular opening around the outlet valve or throttle 108 and between the throat 104 and the conical exhaust channel 150. Generally, the outlet valve or throttle 108 may be longitudinally adjusted to change the pressure within the throat 104 and the exit channel 150 and thereby affect the retrograde flow of lighter species out of the outlet pipes 130.

The separation of the mixture occurs due, in part, to the large centrifugal-like forces acting on the mixture as it spirals down the conical chamber 134 and along the throat 104. Within the throat 104, the heavier species of the mixture collect adjacent the outer side wall 146 and the lighter species collect near the longitudinal axis of the throat 104. At the outlet of the throat 104, the heavier species spiral into the channel 150. The lighter species encounter the region adjacent the blunt end 152 of the outlet valve or throttle 108.

As shown in FIG. 13, the cone-shaped head 126 includes a diameter 160 and a length 162 and defines an angle 164. The diameter 160 is smaller than the second diameter 156 is the outer diameter of the cone-shaped inlet 122 such that the cone-shaped head 126 is capable of moving within the cone-shaped inlet 122. In the illustrated embodiment, the diameter 160 is about 3.5 inches, the length 162 is about 1.3 inches, and the angle 164 is about 30°.

The lighter species flow out of the separator 100 in a flow that is contrary to the flow of the mixture through the channel 150 and the outer flow in the throat 104. Typically, pressure within the separator 100 will be higher than atmospheric pressure. The outlet pipe 116 is at or near atmospheric pressure which will help facilitate a retrograde flow of the lighter species or component(s) collected along the axis of the throat 104, but will allow the heavier species collected along the outer side wall 146 of the throat 104 to flow out through the channel 150. Incomplete separation, minor turbulence, and other factors may cause some lighter species components to flow through the channel 150 along with the heavier species, and may cause some heavier species to flow out of the outlet pipe 116 along with the lighter species. Within the retrograde flow in the throat 104, further separation also occurs as the flow continues to spiral. In the retrograde flow, some heavier species merge with the heavier species in the outer exhaust flow and thus change direction and are exhausted.

In the field, the outlet valve or throttle 108 is, in some instances, movably mounted along the axis of the separator 100. The movable outlet valve or throttle 108 allows the position of the blunt end 152 and the size of the channel 150 to be changed. In addition, in an implementation where the mixture is fed into the separator 100 by way of a pump, the pressure and input velocity of the mixture into separator 100 may also be adjusted. In some uses, such as in water treatment where contaminants are evenly and fairly uniformly distributed, the separator 100 may be optimized in the field once for maximum separation, and then left alone. In other implementations where the portions of components of a mixture may vary, it may be advantageous to provide a control system to monitor the ratios of the components being exhausted through the exhaust and the components being transmitted from the exit channel, and make appropriate adjustments to the pressure of the mixture, the position of the diffuser cone, and other adjustments made possible by the design (such as rates of inflow, inflow pressure rates).

In one implementation, a control system (not shown) that optimizes operation of the separator 100. The control system may include a controller that includes outputs, or control lines to various components that control the separator. The controller may alter the input pressure or the outlet valve or throttle 108 location or both and analyze the mixture at the various sensor locations to determine if separation is improved. The controller may continue to make pressure changes, outlet valve or throttle 108 changes, or both to optimize separation. In addition, control lines may be connected with other components to change the pressure within the separator 100, the input velocity of the mixture, and other parameters.

In mixtures having more than two species, in some arrangements, multiple separators 100 may be employed in series to separate one species per separator. For example, a first separator may be configured so that only the heaviest species passes into the channel 150, and two lighter species flow through the outlet pipe 116. The outlet pipe 116 may then be connected with a pump to feed the mixture of the two remaining species into a second separator configured to separate the remaining heavier species from the remaining lighter species.

As will be recognized from the discussion above, depending on the processing needs of any particular application, a plurality of separators 100 may be connected with a mixture source in a serial arrangement, a parallel arrangement or a combination of serial and parallel arrangements, to process the mixture. For example, separators may be arranged in parallel to process large volumes of a mixture. Or, the scale of the separator may be modified in accordance with the volumetric processing requirements. Alternatively, separators may be arranged in a serial configuration to achieve further separation of a target component of a mixture or to focus separation on particular components of a mixture. Separators may also be arranged serially when incomplete separation occurs in a single separator. For example, a first separator may be capable of processing a water source such that the presence of metals is reduced from 20,000 parts per million (ppm) in the source to 5,000 ppm after processing. Additional separators may be employed to further process the water such that the ppm of metals is further reduced.

Figure 14:
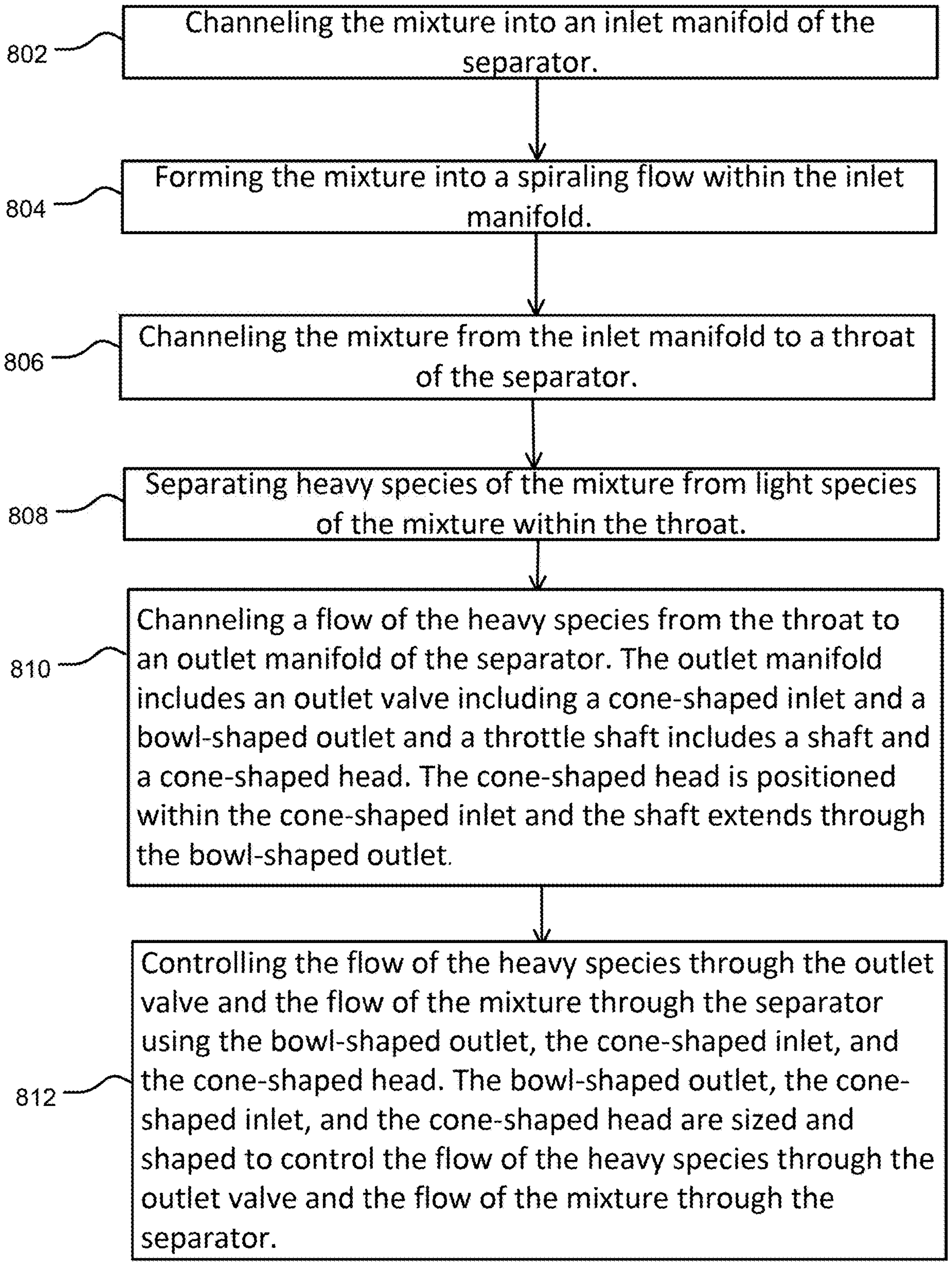
FIG. 14 is a flow diagram a method of separating components of a mixture using the separator illustrated in FIG. 1 in accordance with the present invention.

FIG. 14 illustrates a method 800 of separating components of a mixture using a separator. The method 800 includes channeling 802 the mixture into an inlet manifold of the separator. The method 800 also includes forming 804 the mixture into a spiraling flow within the inlet manifold. The method 800 further includes channeling 806 the mixture from the inlet manifold to a throat of the separator. The method 800 also includes separating 808 heavy species of the mixture from light species of the mixture within the throat. The method 800 further includes channeling 810 a flow of the heavy species from the throat to an outlet manifold of the separator. The outlet manifold includes an outlet valve including a cone-shaped inlet and a bowl-shaped outlet and a throttle shaft includes a shaft and a cone-shaped head. The cone-shaped head is positioned within the cone-shaped inlet and the shaft extends through the bowl-shaped outlet. The method 800 also includes controlling 812 the flow of the heavy species through the outlet valve and the flow of the mixture through the separator using the bowl-shaped outlet, the cone-shaped inlet, and the cone-shaped head. The bowl-shaped outlet, the cone-shaped inlet, and the cone-shaped head are sized and shaped to control the flow of the heavy species through the outlet valve and the flow of the mixture through the separator.

Figure 15:
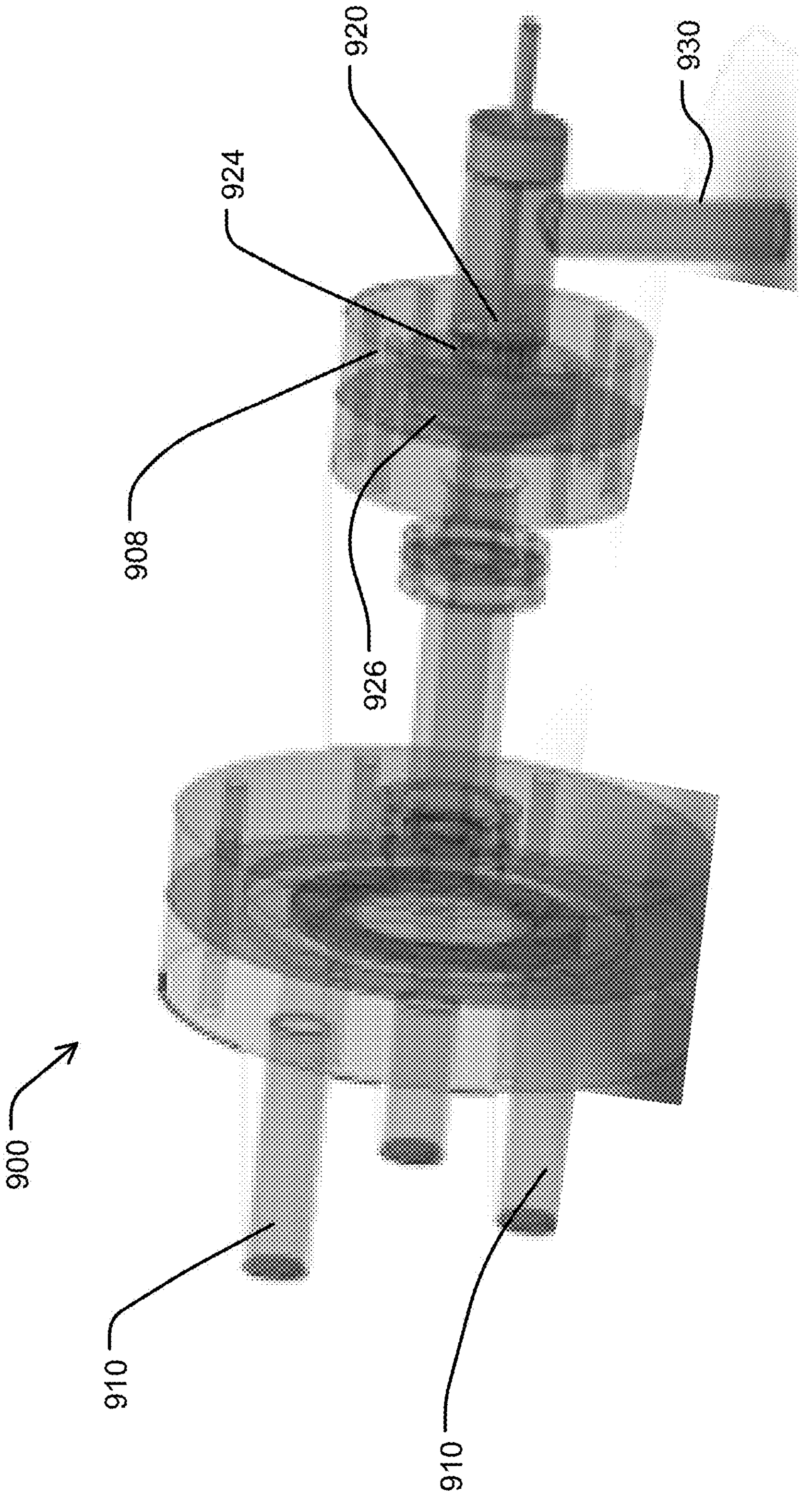
FIG. 15 is a perspective view of an alternative embodiment of a separator in accordance with the present invention.

FIG. 15 is a perspective view of an alternative embodiment of a separator 900.

Figure 16:
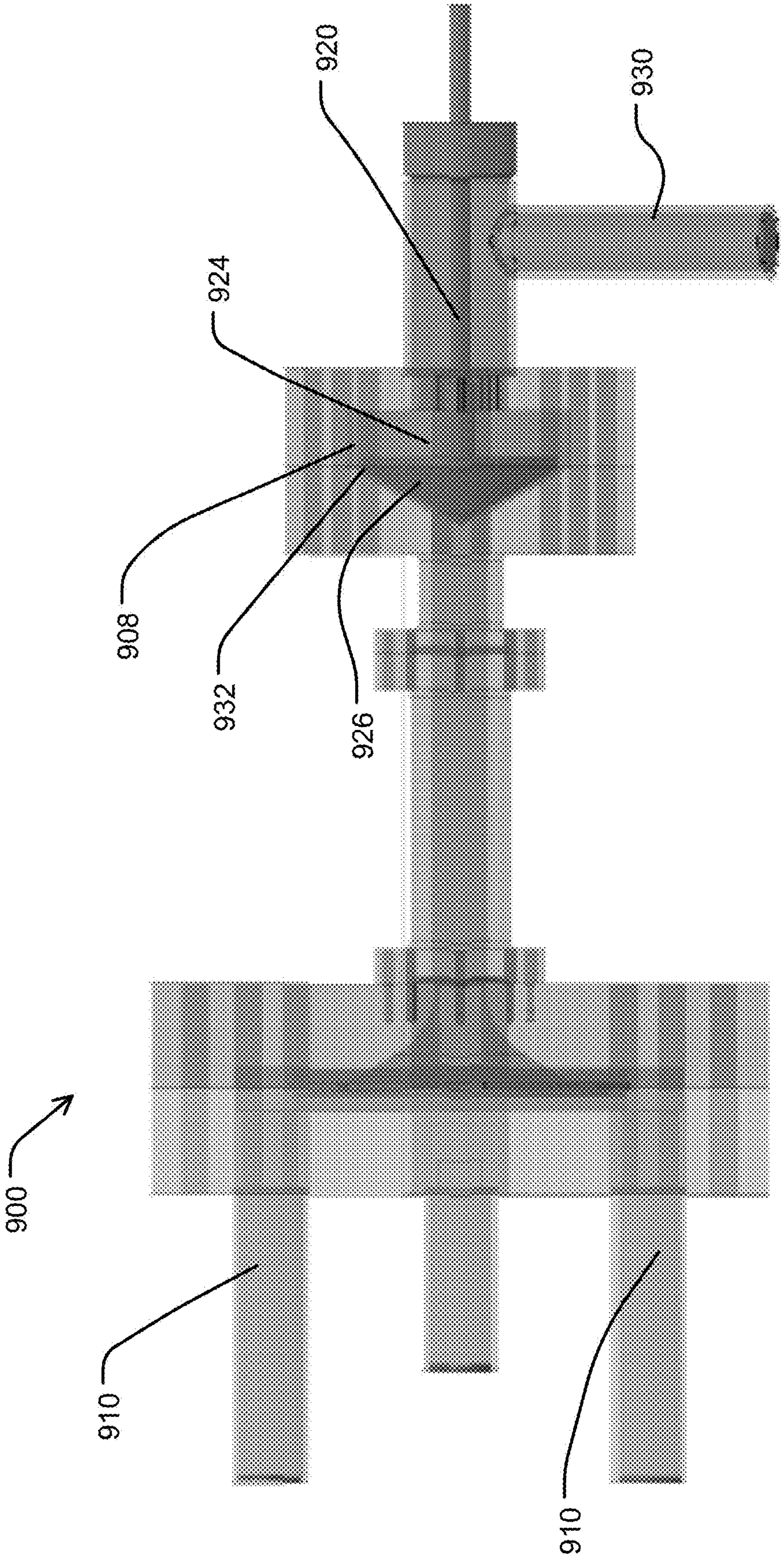
FIG. 16 is a side view of the separator illustrated in FIG. 15 in accordance with the present invention.

FIG. 16 is a side view of the separator 900. Separator 900 is substantially similar to separator 100 except separator 900 includes straight inlet pipes 910 and a single outlet pipe 930 oriented downward. Additionally, the separator 900 also includes an outlet valve or throttle 908 including a cylindrical outlet 924 and a throttle shaft 920 including a cone-shaped head 926 include cylindrical edge 932.

Figure 17:
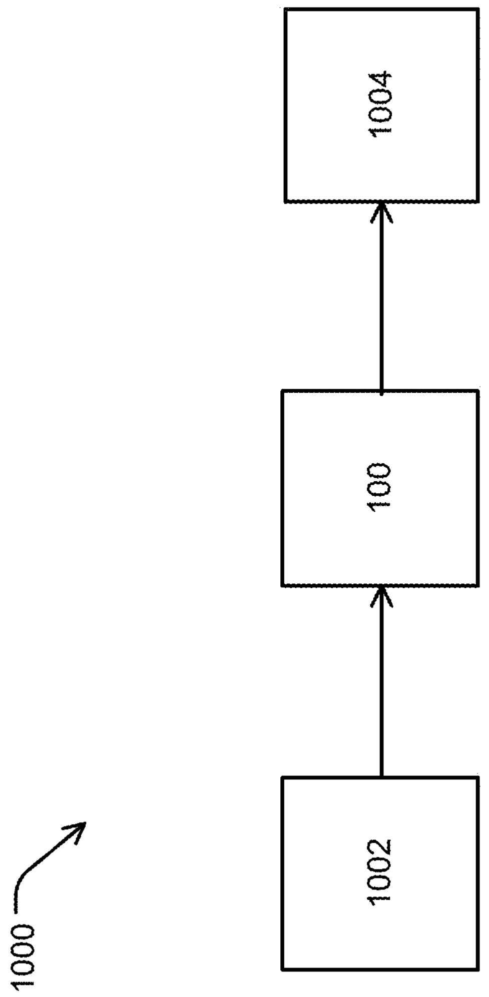
FIG. 17 is a flow diagram of a system for separating components of a mixture using the separator illustrated in FIG. 1 in accordance with the present invention.

FIG. 17 is a flow diagram of a system 1000 for separating components of a mixture using the separator 100. The system 1000 includes the separator 100, a supplying facility 1002, and a receiving facility 1004. The supplying facility 1002 channels a liquid mixture to the separator 100 and the separator 100 separates the liquid mixture as described above. The separator 100 then channels the separated liquids to the receiving facility 1004 for further processing. In the illustrated embodiment, the supplying facility 1002 is a mine, the liquid mixture is black sand from the mine, and the receiving facility 1004 is a processing plant to further process the separated liquid mixture. In alternative embodiments, the supplying facility 1002 and the receiving facility 1004 may be any type of facility that enables the separator 100 to operate as described herein.

The separators described herein partially or completely separating components of a mixture of liquids, solids, or any combination thereof. Specifically, the disclosed separators generate high velocity swirling flows that separate heavy species within the mixture from lighter species within the mixture. For example, the separators described herein may be used to desalinate water, separate heavy metal species (such as gold) from liquid and solid materials, separate nuclear material from liquid and solid materials, and process contaminated water sources to separate the contaminants (such as arsenic, cadmium, copper, iron, lead, zinc, other metals, chemical compositions, and dissolved gases) from the water.

The above specification, examples, and data provide a complete description of the structure and use of exemplary implementations of the invention. Since many implementations of the invention can be made without departing from the spirit and scope of the invention, the invention resides in the claims hereinafter appended. Furthermore, structural features of the different implementations may be combined in yet another implementation without departing from the recited claims. While embodiments and applications of this invention have been shown, and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A separator for separating components of a mixture comprising:

an inlet manifold comprising:

at least two spiral-shaped circular inlet pipes configured to receive a flow of the mixture;

an inlet plate including:

a plurality of spiral-shaped inlet channels the plurality of inlet channels each defining an inlet, an outlet, and a circumferential width, wherein the circumferential width tapers from the inlet of the at least one plurality of inlet channels to each outlet of the plurality of inlet channels; and a conical chamber including a continuous inner conical side wall arranged to abut the plurality of inlet channels, wherein the inlet manifold channels the mixture radially inward into a spiraling flow through the plurality of inlet channels into the conical chamber;

a throat attached to the inlet manifold and configured to receive a flow of the mixture from the inlet manifold, wherein the throat separates heavy species of the mixture from light species of the mixture; and an outlet manifold attached to the throat and configured to receive a flow of the heavy species from the throat, the outlet manifold including:

an outlet valve including:

a cone-shaped inlet and a bowl-shaped outlet, the bowl-shaped outlet including a single outlet pipe and two branching outlet pipes branching off from the single outlet pipe; and a throttle shaft including a shaft and a cone-shaped head, the throttle shaft extending through the bowl-shaped outlet and the single outlet pipe, wherein the cone-shaped head is positioned within the cone-shaped inlet, wherein the bowl-shaped outlet, the cone-shaped inlet, and the cone-shaped head are sized and shaped to control the flow of the heavy species through the outlet valve and the flow of the mixture through the separator;

wherein the separator is configured to reduce a concentration of a precious metal in a water source from 20,000 parts per million to 5,000 parts per million, wherein the mixture comprises particles having a particle diameter of approximately 10 microns, and wherein the separator is configured to separate at least 90% of the particles from the mixture.

2. The separator of claim 1, wherein the continuous inner conical side wall abuts the throat.

3. The separator of claim 1, wherein the inlet manifold comprises an outlet pipe disposed along an axis of the throat and the conical chamber.

4. The separator of claim 1, wherein the cone-shaped head includes a blunt end positioned near an outlet of the throat.

5. The separator of claim 3, wherein the separator is configured to channel a flow of a light species from the throat to the outlet pipe.

6. The separator of claim 1, wherein the continuous inner conical side wall defines an angle relative to a center line of the conical chamber that continuously varies along a length of the conical chamber and the continuous inner conical side wall curves along the center line of the conical chamber.

7. The separator of claim 1, wherein the cone-shaped head is configured to move toward the cone-shaped inlet to reduce the flow of heavy species out of the separator.

8. The separator of claim 1, wherein the separator is configured to separate precious metals from the mixture.

9. The separator of claim 1, wherein the single outlet pipe is disposed along an axis of the throat and the conical chamber.

10. The separator of claim 1, wherein the plurality of inlet channels and the continuous inner conical side wall create a smooth transition from the inlet plate to the conical chamber.

11. The separator of claim 1, wherein the continuous inner conical side wall abuts the throat, and wherein the plurality of inlet channels and the throat create a smooth transition from the conical chamber to the throat.

12. The separator of claim 1, wherein the outlet of each of the plurality of inlet channels defines a first diameter relative to a center line of the conical chamber and the continuous inner conical side wall at an inlet of the conical chamber defines a second diameter relative to the center line of the conical chamber equal to the first diameter, wherein the inlet of each of the plurality of inlet channels defines a third diameter relative to a center line of the conical chamber and the third diameter is greater than the first diameter and the second diameter.

13. A method of separating components of a mixture using a separator, the method comprising: channeling the mixture into at least two circular spiral-shaped inlet pipes, wherein the at least two circular inlet pipes form the mixture into a spiraling flow;

channeling the mixture into an inlet manifold of the separator from the at least two circular inlet pipes, wherein the inlet manifold comprises a conical chamber and an inlet plate, wherein the inlet plate defines a plurality of spiral-shaped inlet channels, wherein the plurality of inlet channels each define an inlet, an outlet, and a circumferential width, wherein the circumferential width of each of the plurality of inlet channels tapers from the inlet of each of the plurality of inlet channels to the outlet of each of the plurality of inlet channels, wherein the conical chamber comprises a continuous inner conical side wall arranged to abut the outlet of each of the plurality of inlet channels;

channeling the mixture radially inward from the inlet manifold into the inlet of each of the plurality of inlet channels;

channeling the mixture radially inward through the inlet of the plurality of inlet channels to the outlet of each of the plurality of inlet channels;

channeling the mixture radially inward from the inlet manifold through the plurality of inlet channels and into the conical chamber;

forming the spiraling flow of the mixture within the at least two circular inlet pipes and the inlet manifold, channeling the mixture from the conical chamber to a throat of the separator;

separating heavy species of the mixture from light species of the mixture within the throat;

channeling a flow of the heavy species from the throat to an outlet manifold of the separator, the outlet manifold including an outlet valve including a cone-shaped inlet and a bowl-shaped outlet and a throttle shaft including a shaft and a cone-shaped head, wherein the cone-shaped head is positioned within the cone-shaped inlet, wherein the bowl-shaped outlet comprises a single outlet pipe and two branching outlet pipes branching off from the single outlet pipe, wherein the shaft extends through the bowl-shaped outlet and the single outlet pipe; controlling the flow of the heavy species through the outlet valve and the flow of the mixture through the separator using the bowl-shaped outlet, the cone-shaped inlet, and the cone-shaped head;

reducing a concentration of a precious metal in a water source from 20,000 parts per million to 5,000 parts per million, wherein the mixture comprises particles having a particle diameter of approximately 10 microns;

separating at least 90% of the particles from the mixture; and channeling the heavy species out of the separator.

14. The method of claim 13, wherein the plurality of inlet channels and the continuous inner conical side wall create a smooth transition from the inlet plate to the conical chamber.

15. The method of claim 13, wherein the continuous inner conical side wall abuts the throat, and wherein the plurality of inlet channels and the throat create a smooth transition from the conical chamber to the throat.

16. The method of claim 13, wherein the inlet manifold comprises an outlet pipe disposed along an axis of the throat and the conical chamber, and wherein the method further comprises channeling a flow of the light species from the throat to the outlet pipe.

17. The method of claim 13, wherein controlling the flow of the heavy species through the outlet valve and the flow of the mixture through the separator using the bowl-shaped outlet comprises moving the cone-shaped head within the cone-shaped inlet.

18. The method of claim 17, wherein moving the cone-shaped head toward the cone-shaped inlet reduces the flow of heavy species out of the separator.

19. The method of claim 13, wherein the mixture comprises precious metals, the method further comprising:

separating the precious metals from the mixture.

20. The method of claim 13, wherein the continuous inner conical side wall defines an angle relative to a center line of the conical chamber that continuously varies along a length of the conical chamber and the continuous inner conical side wall curves along the center line of the conical chamber.

21. The method of claim 13, wherein the cone-shaped head includes a blunt end positioned near an outlet of the throat.

22. The method of claim 13, wherein the outlet of each of the plurality of inlet channels defines a first diameter relative to a center line of the conical chamber and the continuous inner conical side wall at an inlet of the conical chamber defines a second diameter relative to the center line of the conical chamber equal to the first diameter, wherein the inlet of each of the plurality of inlet channels defines a third diameter relative to the center line of the conical chamber and the third diameter is greater than the first diameter and the second diameter.

* * * * *